US 6,648,953 B2

(12) United States Patent
Yamazaki et al.

(10) Patent No.: US 6,648,953 B2
(45) Date of Patent: Nov. 18, 2003

(54) INK COMPOSITION FOR INK JET RECORDING, PROCESS FOR THE PREPARATION THEREOF, AND INK JET RECORDING PROCESS USING SAID INK COMPOSITION

(75) Inventors: Hideo Yamazaki, Nagano (JP); Michinari Tsukahara, Nagano (JP); Hiroto Nakamura, Nagano (JP); Hidehiko Komatsu, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/842,180

(22) Filed: Apr. 26, 2001

(65) Prior Publication Data

US 2002/0017219 A1 Feb. 14, 2002

Related U.S. Application Data

(63) Continuation-in-part of application No. 09/076,760, filed on May 13, 1998, now abandoned.

(30) Foreign Application Priority Data

Aug. 25, 1997 (JP) .............................................. 9-228344

(51) Int. Cl.$^7$ ............................................... C09D 11/02
(52) U.S. Cl. .................................... 106/31.68; 106/31.9
(58) Field of Search .............................. 106/31.68, 31.9

(56) References Cited

U.S. PATENT DOCUMENTS

| 5,026,427 A | | 6/1991 | Mitchell et al. ............. 106/31.6 |
| 5,114,477 A | | 5/1992 | Mort et al. ................. 106/31.6 |
| 5,439,514 A | | 8/1995 | Kashiwazaki et al. ... 106/31.65 |
| 5,723,514 A | | 3/1998 | Nachfolger et al. ........ 523/161 |
| 5,746,817 A | | 5/1998 | Katsen et al. ............. 106/31.65 |
| 5,760,124 A | | 6/1998 | Listigovers et al. ........ 524/505 |
| 5,803,958 A | | 9/1998 | Katsen et al. ............. 106/31.65 |
| 5,843,220 A | | 12/1998 | Babler ........................ 106/415 |
| 5,851,274 A | | 12/1998 | Lin ........................... 106/31.43 |
| 5,954,866 A | * | 9/1999 | Ohta et al. ................ 106/31.89 |
| 5,973,026 A | * | 10/1999 | Burns et al. ................ 523/160 |
| H1828 H | * | 1/2000 | Wong et al. ................ 523/161 |
| 6,030,440 A | * | 2/2000 | Sekioka et al. ........... 106/31.65 |
| 6,039,796 A | * | 3/2000 | Kubota et al. .............. 106/31.6 |
| 6,084,619 A | * | 7/2000 | Takemoto et al. ............ 347/96 |
| 6,241,811 B1 | * | 6/2001 | Sano ........................ 106/31.85 |
| 6,379,443 B1 | * | 4/2002 | Komatsu et al. ......... 106/31.58 |
| 6,383,274 B1 | * | 5/2002 | Lin .......................... 106/31.27 |
| 6,383,275 B1 | * | 5/2002 | Lin .......................... 106/31.27 |

FOREIGN PATENT DOCUMENTS

| EP | 0 441 987 A3 | 8/1991 |
| EP | 0 475 075 A1 | 3/1992 |
| EP | 0 784 085 A2 | 7/1997 |
| JP | 4-57861 | 2/1992 |
| JP | 6-287492 | 10/1994 |

* cited by examiner

*Primary Examiner*—Mark L. Bell
*Assistant Examiner*—Veronica F. Faison
(74) *Attorney, Agent, or Firm*—Sughrue Mion, PLLC

(57) ABSTRACT

The present invention provides an ink composition for an ink jet recording process, which exhibits excellent print quality with good water fastness and light fastness and without flying in deflected directions from the ink head or nozzle fill-in even after a prolonged ink jet printing. The ink comprises (1) a carbon black, (2) an organic pigment, (3) a dispersant incorporated in an aqueous medium and (4) a saccharide.

18 Claims, No Drawings

INK COMPOSITION FOR INK JET RECORDING, PROCESS FOR THE PREPARATION THEREOF, AND INK JET RECORDING PROCESS USING SAID INK COMPOSITION

This is a Continuation in Part of application Ser. No. 09/076,760 filed on May 13, 1998 now abandoned.

FIELD OF THE INVENTION

The present invention relates to an ink composition for ink jet recording, a process for the preparation of such an ink composition, and an ink jet recording process using such an ink composition.

BACKGROUND OF THE INVENTION

A composite black comprising a cyan ink, a yellow ink and a magenta ink can be used as a black ink in the ink jet recording process. In general, however, the composite black provides low density. Further, the image printed from the composite black has a deteriorated light fastness. Thus, as the coloring agent, carbon black has heretofore been mainly used. However, since the single use of carbon black as a coloring agent may impair the stability of ink jetting from the recording head, attempts have heretofore been made to overcome these difficulties.

For example, JP-A-4-57861 (The term "JP-A" as used herein means an "unexamined published Japanese patent application") discloses an aqueous black ink comprising carbon black and a dye. This ink allegedly exhibits excellent print fastness (e.g., water fastness, marker resistance, abrasion resistance), as well as excellent jetting stability.

Further, JP-A-6-287492 discloses an aqueous black comprising an inorganic pigment (particularly carbon black), a dispersant and particulate titanium dioxide or alumina. This ink allegedly enables a recording process with excellent reliability that provides excellent print density and quality.

Although the prior art ink jet recording process using the foregoing ink exhibits excellent jetting stability over a short period of time, there arise two problems concerning unstable jetting when printing is carried out over a long period of time.

One of these problems is a phenomenon that, in the case of continuously printing over a long period of time of several hours or longer, ink droplets fly irregularly in randomly deflected directions (hereinafter referred to as "malalignment"), and thus it becomes impossible to achieve recording on a recording paper as expected. This phenomenon of malalignment is a critical defect in recent recording processes with a requirement for high image qualities and in the so-called plural copy-recording process, which will be in great demand in the future where a printer should be operated over an extended period of time.

Another problem is a phenomenon that, when allowed to stand over a long period of time of ten days or longer after the completion of printing, the ink jet head is clogged, and thus ink cannot be jetted therefrom any longer, i.e., so-called fill-in.

Between these phenomena concerning unstable jetting, malalignment occurs particularly in the case of using carbon black as a colorant for a black ink.

Further, the above-described black ink comprising a dye is disadvantageous in that the resulting printed matter leaves something to be desired in light fastness.

SUMMARY OF THE INVENTION

Therefore, an object of the present invention is to eliminate the foregoing malalignment which can occur when the ink jet recording process is used over an extended period of time while maintaining the desired print quality required for an ink composition for the ink jet recording process.

The foregoing object can be accomplished with the ink composition for ink jet recording process of the present invention, comprising
(1) a carbon black,
(2) an organic pigment and
(3) a dispersant and
(4) at least one saccharide incorporated in an aqueous medium.

DETAILED DESCRIPTION OF THE INVENTION

Suitable examples of the carbon black incorporated in the ink composition include those which have heretofore been commonly used in conventional ink compositions for ink jet recording process. Specific examples of suitable carbon blacks include furnace black, lamp black, acetylene black, and channel black.

The organic pigments are not particularly restricted so long as the organic pigments are dispersible in aqueous media. Examples of yellow organic pigments include C.I. Pigment Yellow 1 (Hanza yellow G), 2, 3 (Hanza yellow 10G), 4, 5 (Hanza yellow 5G), 6, 7, 10, 11, 12, 13, 14, 16, 17, 24 (flavanthron yellow), 34, 35, 37, 53, 55, 65, 73, 74, 75, 81, 83, 93, 94, 95, 97, 98, 99, 108 (anthrapyrimidine yellow), 109, 110, 113, 117 (copper complex salt pigment), 120, 124, 128, 129, 133 (quinophthalone), 138, 139 (isoindolinone), 147, 151, 153 (nickel complex pigment), 154, 167, 172 and 180.

Examples of Magenta organic pigments include C.I. Pigment Red 1 (Para-red), 2, 3 (toluidine red), 4, 5 (ITR Red), 6, 7, 8, 9, 10, 11, 12, 14, 15, 16, 17, 18, 19, 21, 22, 23, 30, 31, 32, 37, 38 (pyrazolone red), 40, 41, 42, 88 (thioindigo), 112 (naphthol AS-type), 114 (naphthol AS-type), 122 (dimethylquinacridone), 123, 144, 146, 149, 150, 166, 168 (anthoanthorone orange), 170 (naphthol AS-type), 171, 175, 176, 177, 178, 179 (prylene maroon), 185, 187, 202, 209 (dichloroquinacridone), 219, 224 (perylene type), 245 (naphtol AS-type) or C.I. Pigment Violet 19 (quinacridone), 23 (dioxazine violet), 32, 33, 36, 38, 43 and 50.

Examples of organic cyan pigments include C.I. Pigment Blue 15, 15:1, 15:2, 15:3, 15:4, 16 (metal-free phthalocyanine), 18 (alkali blue toner), 25, 60 (Threne Blue), 65 (Violanthrone) and 66 (indigo).

As a black organic pigment, use can be made of, for example, aniline black (C.I. Pigment Black 1).

It is also possible to use organic color pigments other than magenta, cyan and yellow such as C.I. Pigment Green 7 (phthalocyanine green), 10 (green gold), 36, 37; C.I. Pigment Brown 3, 5, 25 and 26; or C.I. Pigment Orange 1, 2, 5, 7, 13, 14, 15, 16, 24, 34, 36, 38, 40, 43 and 63.

The ink composition according to the present invention is suitable as long as it comprises, as pigments, a carbon black and at least one organic pigment incorporated therein. In order to adjust the color tone, the carbon black and two or three or more organic pigments may be combined. In the case of a combination of a carbon black and one organic pigment, the organic pigment is preferably selected from the group consisting of organic pigments having a color tone close to black, more preferably C.I. pigment black 1 (aniline black), C.I. pigment brown 26 (perylene black), C.I. pigment violet, C.I. pigment green, and C.I. pigment blue. In order to properly mix color tones, organic pigments respectively selected from the group consisting of carbon black and C.I. pigments Y, M and C may be added to the carbon black.

The total amount of pigment, i.e., the sum of the amount of the carbon black and the organic pigment, is determined to achieve the color and density required for printed material or desired physical properties of ink and the amount varies with the specific gravity or bulk density of the pigment. Thus, the amount is not specifically limited. In practice, however, it is preferably from 0.5 to 30% by weight, more preferably from 1 to 12% by weight, based on the total weight of the ink composition. If the total amount of the pigment falls below 0.5% by weight, the desired print density may not be obtained. On the contrary, if the total amount of the pigment exceeds 30% by weight, the ink composition exhibits a structural viscosity that makes it impossible to secure the desired jetting stability. If the total amount of the pigment falls within the range of from 1 to 12% by weight, a high print density can be obtained and the resulting ink composition is quite suitable for the ink jet recording process.

The ratio of the amount of carbon black to the amount of organic pigment (carbon black:organic pigment) (w/w) varies with the various properties of the carbon black used and the organic pigment selected, and thus is not specifically limited. In practice, however, it is preferably from 95:5 to 30:70, more preferably from 90:10 to 50:50. If the amount of carbon black exceeds 9 times by weight that of the organic pigment, long-term jetting stability can be impaired. On the contrary, if the amount of carbon black falls below 3/7 times by weight that of the organic pigment, sufficient print density cannot be achieved, or the light fastness of the printed material can be impaired. If the foregoing amount ratio (carbon black:organic pigment) falls within the range of from 90:10 to 50:50, the desired long-term jetting stability and print quality can be achieved.

The ink composition according to the present invention comprises a dispersant which allows the carbon black and the organic pigment to be dispersed in an aqueous medium. Suitable examples of dispersants to be incorporated in the ink composition of the present invention include a copolymer resin having a hydrophilic moiety and a hydrophobic moiety in its molecule. Specific examples of suitable dispersants include acrylic acid-based dispersants such as styrene-acrylic acid copolymer, styrene-acrylic acid-acrylic acid ester copolymer, styrene-methacrylic acid copolymer and styrene-methacrylic acid-acrylic acid ester copolymer, maleic acid-based dispersant such as styrene-maleic acid copolymer, acrylic acid ester-maleic acid copolymer and styrene-acrylic acid ester-maleic acid copolymer, sulfonic acid-based dispersants such as acrylic acid ester-styrenesulfonic acid copolymer, styrene-methacrylsulfonic acid copolymer and acrylic acid ester-allylsulfonic acid copolymer, and salts thereof. The dispersant to be used in the present invention is preferably a resin dispersant, more preferably a styrene acrylic acid copolymer dispersant, particularly a copolymer dispersant having a weight-average molecular weight (hereinafter simply referred to as "molecular weight") of from 1,600 to 25,000 and an acid value of from 100 to 250.

Suitable styrene-acrylic acid copolymer dispersants are commercially available. Specific examples of commercially available styrene-acrylic acid copolymer dispersants employable in the present invention include those available from Johnson Polymer Corporation such as Joncryl 68 (molecular weight: 10,000; acid value: 195), Joncryl 679 (molecular weight: molecular weight: 7,000; acid value: 200), Joncryl 680 (molecular weight: 3,900; acid value: 215), Joncryl 682 (molecular weight: 1,600; acid value: 235), Joncryl 550 (molecular weight: 7,500; acid value: 2000, Joncryl 555 (molecular weight: 5,000; acid value: 200), Joncryl 586 (molecular weight: 3,100; acid value: 105), Joncryl 683 (molecular weight: 7,300; acid value: 150), and B-36 (molecular weight: 6,800; acid value: 250).

The amount of the resin dispersant varies with the type and amount of carbon black and organic pigment used, and thus is not specifically limited. In practice, however, the weight ratio of the entire pigment to the resin dispersant is preferably from 20:1 to 5:2.

If the amount of the resin dispersant falls below the above defined range, the dispersion stability (agglomeration, deterioration of viscosity) of the pigment with time can be deteriorated if the ink composition is allowed to stand. On the contrary, if the amount of the resin dispersant exceeds the above defined range, redispersibility that is required when the ink composition is dried cannot be occasionally obtained.

Preferably a salt of the acrylic acid moiety is formed in the foregoing resin dispersant to allow the resin dispersion to be produced. Examples of alkali neutralizers include compounds which provide a counter ion for the acrylic acid moiety, e.g., aminomethyl propanol, 2-aminoisopropanol, triethanolamine, morpholine, aqueous ammonia. The amount of the alkali neutralizer may not be less than the value such that the resulting counter ion is able to neutralize the foregoing resin dispersant (neutralization equivalent). If the amount of the alkali neutralizer is about 1.3 times the neutralization equivalent, desirable fixability after printing is achieved. Further, propylene glycol and/or isopropanol may be used as a dissolution aid for resin dispersant.

In order to provide the foregoing dispersant with the desired dissolution stability, a pH buffer is preferably added to the ink composition to adjust the ink composition to an optimum pH value so that the salt in the dispersant can easily dissociate and ions can be formed. Specific examples of such a pH buffer include aqueous solutions of potassium hydrogen phthalate, potassium dihydrogenphosphate, sodium dihydrogenphosphate, sodium tetraborate, potassium hydrogen tartrate, sodium hydrogencarbonate, sodium carbonate, tris(hydroxymethyl) aminomethane and tris (hydroxymethyl) aminomethane hydrochloride. The amount of such a pH buffer is preferably an amount such that the resulting ink composition has a pH value of from 7 to 10 from the standpoint of durability of head member and ink composition stability.

The ink composition of the present invention preferably includes a thermoplastic resin emulsion incorporated therein. The thermoplastic resin emulsion may be prepared by emulsion polymerization or suspension polymerization of an ethylenically unsaturated monomer in water or by the emulsification of a thermoplastic resin in water.

Suitable thermoplastic resin components to be incorporated in the foregoing the thermoplastic resin emulsion include the same thermoplastic resin component as used in the thermoplastic resin emulsion previously used in conventional ink compositions for the ink jet recording process. Specific examples of thermoplastic resins employable herein include acrylic polymers such as polyacrylic acid ester, copolymer thereof, polymethacrylic acid ester, copolymer thereof, polyacrylonitrile, copolymer thereof, polycyano acrylate, polyacrylainide, polyacrylic acid and polymethacrylic acid, polyolefinic polymers such as polyethylene, polypropylene, polybutene, polyisobutylene, polystyrene, copolymer thereof, petroleum resin, cumarone-indene resin and terpene resin, vinyl acetate-vinyl alcohol polymers such as vinyl polyacetate, copolymer thereof, polyvinyl alcohol, polyvinyl acetal and polyvinyl ether, halogen-containing polymers such as polyvinyl chloride, copolymer thereof, polyvinylidene chloride, fluororesin and fluorine rubber, nitrogen-containing vinyl polymers such as polyvinyl carbazole, polyvinyl pyrrolidone, copolymer thereof, polyvinyl pyridine and polyvinyl imidazole, diene polymers such as polybutadiene, copolymer thereof, polychloroprene and polyisoprene (butyl rubber), and other ring-opening polymerization type resins, condensation polymerization type resins and natural polymer resins.

The amount of the foregoing thermoplastic resin component is preferably not more than 30% by weight, more preferably from 0.5 to 30% by weight, particularly preferably from 1 to 20% by weight, based on the total weight of the ink composition. The arrangement of the amount of the thermoplastic resin component to not less than 0.5% by weight makes it possible to provide an even higher print quality, particularly a high print density. The arrangement of the amount of the thermoplastic resin component to not more than 30% by weight makes it possible to provide the resulting ink composition with a desired fixability while inhibiting the occurrence of fill-in.

The ink composition according to the present invention further comprise a water-soluble high molecular weight compound incorporated therein preferably in an amount of not more than 15% by weight, more preferably from 3 to 10% by weight based on the total weight of the ink composition to achieve a proper viscosity.

As the water-soluble high molecular weight compound, one or more saccharides selected from the group consisting of monosaccharides, disaccharides and polysaccharides or derivatives thereof can be used.

Examples of the monosaccharides usable include glucose, mannose, fructose, ribose, xylose, arabinose, galactose, furanose, talose, erythrol, threose, erythrose, xylulose, fructose, tagatose and sorbose.

Particular examples of the disaccharides include saccharose (sucrose), maltitol, maltose, mannitol, glucitol, lactose, cellobiose, trehalose, nigerose, isomaltose and isotrehalose.

As the polysaccharides (trisaccharides or higher), maltotriose, panose, isomaltotriose, maltotetraose and maltopentaose can be used. Use of these water-soluble polymer compounds makes it possible to prevent the occurrence of fill-in (clogging) at ink jet head and improve the jetting stability of ink compositions.

In the present invention, it is also possible to use marketed products as the saccharides described above. Particular examples thereof include Trehaose (main component: trehalose), Mabit (main component: maltitol), Pullulan (main component: maltotriose), HS-300 (a mixture of monosaccharides, disaccharides and polysaccharides) and HS-500 (a mixture of monosaccharides, disaccharides and polysaccharides) which are each available from Hayashibara Shoji, Inc.

Further, compounds having a high hydroxyl group content and a high water solubility such as a water-soluble resin (e.g., polyvinyl alcohol, sodium alginate, polyethylene oxide) and modification products thereof may be used, alone or in combination. If such a water-soluble high molecular compound is used, the jetting stability of the ink composition can be enhanced.

Further, the ink composition according to the present invention may optionally include a water-soluble polyvalent alcohol incorporated therein preferably in an amount of not more than 25% by weight, more preferably from 6 to 20% by weight, based on the total weight of the ink composition to achieve the desired jetting stability. However, if the amount of such a water-soluble polyvalent alcohol is too great, the resulting ink composition can be poor in drying. Thus, care must be taken.

Examples of the above water-soluble polyvalent alcohol include, e.g., a $C_{3-10}$ divalent or trivalent alcohol. For example, glycerin, ethylene glycol, diethylene glycol, triethylene glycol, dipropylene glycol, hexylene glycol, and 1,2,6-hexanetriol may be used, alone or in combination.

Further, the ink composition according to the present invention may optionally include a surface active agent incorporated therein preferably in an amount of not more than 2% by weight, more preferably from 0.1 to 1% by weight, based on the total weight of the ink composition to achieve the desired jetting stability. However, if the amount of such a surface active agent is too great, the resulting ink composition exhibits too great a foamability, possibly impairing the jetting stability.

Examples of suitable surface active agents employable herein include anionic surface active agents such as higher aliphatic acid salt, higher alkyldicarboxylic acid salt, higher alcoholsulfuric acid ester, higher alkylsulfonic acid salt, alkylbenzenesulfonate, alkylnaphthalenesulfonate, salt of naphthalenesulfonic acid with sodium, potassium, lithium or calcium, polycondensate of formalin, condensate of higher aliphatic acid with amino acid, dialkylsulfosuccinic acid ester, alkylsulfosuccinic acid, naphthenic acid salt, alkylethercarboxylate, acylated peptide, α-olefinsulfonate, N-acylmethyltaurine, alkylethersulfate, secondary higher alcohol ethoxy sulfate, monoglysulfate, alkyletherphosphoric acid ester, alkylphosphoric acid ester, ammonium salt of polyoxyethylenealkylethersulfuric acid, sodium salt of polyoxyethylenealkylethersulfuric acid, ammonium salt of polyoxyethylenealkylphenylethersulfuric acid, sodium salt of polyoxy-ethylenealkylphenylethersulfuric acid, monoethanolamine of polyoxyethylene-alkylsulfuric acid, ammonium salt of polyoxyethylenealkyletherphosphoric acid, potassium salt of polyoxyethylenealkylether-phosphoric acid, diethanolamine of polyoxyethylenealkyletherphosphoric acid, sodium alkylnaphthalenesulfonate and sodium laurylsulfate, and nonionic surface active agents such as fluorine-based surface active agent, silicone-based surface active agent, polyoxyethylene sorbitan monolaurate, polyoxyethylene sorbitan monostearate, polyoxyethylene alkyl phenyl ether, sorbitan monostearate, acetylene glycol, ethylene oxide adduct of acetylene glycol (acetylene glycol alcohol ethylene oxide), propylethanolamide, polyoxyethylene alkyl ether, and polyoxyethylene alkyl phenyl ether.

The ink composition according to the present invention also comprises various ingredients incorporated in an aqueous medium. Accordingly, the ink composition of the present invention may comprise a monovalent alcohol incorporated therein preferably in an amount of not more than 15% by weight, more preferably from 1 to 10% by weight, based on the total weight of the ink composition in addition to water as a main solvent to enhance dryability and penetrating power of the ink composition. Examples of monovalent alcohols are $C_{2-4}$ alkanols. For example, ethanol, 1-propanol, 2-propanol, 1-butanol, 2-butanol, isobutanol, and t-butanol may be used, alone or in combination of two or more.

Further, the ink composition according to the present invention may optionally include benzoic acid, dichlorophene, hexachlorophene, sorbic acid, p-hydroxybenzoic acid ester, ethylenediaminetetraacetic acid (EDTA), sodium dehydroacetate, 1,2-benzothiazoline-3-one [trade name: Proxel XLII (available from ICI)], 3,4-isothiazoline-3-one, etc. incorporated therein for the purpose of mildewproofing, corrosion prevention, rust prevention, etc. Further, the ink composition according to the present invention may optionally include urea, thiourea and/or ethyleneurea, etc. incorporated therein for the purpose of preventing the nozzle from drying out.

Various properties of the ink composition according to the present invention can be appropriately controlled. In a preferred embodiment of the present invention, the viscosity of the ink composition is preferably not more than 25 mPa sec., more preferably not more than 10 mPa sec –(25° C.). If the viscosity of the ink composition of the present invention falls within the above defined range, the ink composition can be stably jetted from the ink jet head. Further, the surface tension of the ink composition can be appropriately controlled. In practice, however, it is preferably from 30 to 50 nN/m (25° C.).

The ink composition according to the present invention can be prepared, e.g., by simultaneously adding a carbon black, an organic pigment and a dispersant to an aqueous medium, and then dispersing the mixture. The dispersion is not specifically limited. For example, the dispersion may involve a first step of dissolving a dispersant, an alkali neutralizer and a dissolution aid in an aqueous medium (e.g., ion-exchanged water) to prepare a uniform solution (vehicle), a second premixing step of simultaneously adding a carbon black and an organic pigment to the vehicle to cause penetration of the dispersant component, and a third step of atomizing the mixture using a bead mill. Further, in order to accelerate the adsorption of the dispersant on the surface of the pigment, the ink composition may be subjected to a post-treatment such as low shear-rate stirring.

The ink composition according to the present invention can be advantageously used in any ink jet recording process. In particular, where the ink composition according to the present invention is used in the ink jet recording process which comprises jetting droplets of ink composition through the print head onto a heated recording medium to form an ink image thereon, when the ink is attached to the recording medium which has been heated to a temperature of about 80° C. to 120° C., it is heated to show a rapid thickening, making it possible to obtain a high quality image.

Further, the carbon black to be incorporated in the ink composition for ink jet recording process has a primary particle diameter of from 10 to 40 nm on the average. In an aqueous medium, these primary particles of carbon black are not individually dispersed. Several or scores of these primary particles are connected in series to form a cluster structure. Thus, these particles are dispersed in the form of secondary particle units having a size of from 100 nm to 200 nm. On the other hand, the organic pigment has a primary particle diameter of from 20 to 100 nm on the average. In an aqueous medium, these organic pigment particles are dispersed alone or in the form of secondary particles having a size of from 40 to 200 nm formed by the agglomeration of several particles at most.

In other words, the carbon black exhibits a structural form due to a strong interparticle action. These particles are attracted to each other. Thus, the carbon black is stably dispersed in the form of a structure having a size of from 5 to 10 times that of the primary particle. On the contrary, it was found that because of its weak mutual interaction, the organic pigment particles are stable alone or in the form of a structure having a size of several times that of the primary particle.

Referring to the ink composition for ink jet recording process comprising the carbon black or organic pigment alone, respectively, the ink composition comprising the organic pigment but free of carbon black can be stably jetted from the recording head in a stable manner over an extended period of time without flying in deflected directions, making it possible to obtain good print quality. However, the ink composition containing the carbon black but no organic pigment can initially print without flying in deflected directions but such flying in deflected directions (malalignment) occurs more occasionally with the passage of time if it is jetted over an extended period of time, eventually giving deteriorated prints after scores of minutes to several hours. A similar phenomenon is observed with another combination of carbon black and organic pigment having the same primary particle diameter as mentioned above. Accordingly, it is thought that the difference in physical or chemical action between primary particles causes the foregoing phenomenon.

The inventors added an organic pigment to a carbon black, and then stirred the mixture to effect dispersion. As a result, a surprising fact was found that the incorporation of an organic pigment makes it possible to prevent the ink composition comprising a carbon black alone from flying in deflected directions (malalignment) and to provide the ink composition with almost the same long-term jetting stability as the ink composition comprising an organic pigment alone. Further, the incorporation of an organic pigment in a carbon black makes it possible to provide the printed material with an excellent light fastness and to give a satisfactory print quality. In other words, the combination of carbon black with an organic pigment makes it possible to maintain excellent light fastness inherent to a pigment while securing long-term jetting stability (elimination of malalignment). Further, the reddish tinge inherent to carbon black can be easily eliminated by properly selecting the mixing proportion of organic pigment.

Further, the condition of nozzle orifice in the ink head was observed under a microscope. As a result, it was found that a thin film is uniformly formed on the entire circumference in the vicinity of the nozzle hole when the ink composition comprising an organic pigment but no carbon black is used while the carbon black is attached only to a portion around the nozzle hole when the ink composition comprising a carbon black but no organic pigment is used. This is probably because when the ink is jetted from the nozzle orifice, the ink is subjected to a high shear rate which causes the carbon black particles to be attracted to each other due to their mutual interaction, causing the ink to scatter. Accordingly, when the ink composition comprising a carbon black but no organic pigment is used, the ink composition that is jetted is acted on by the carbon black attached to a portion around the ink nozzle orifice to fly in deflected directions. On the contrary, when the ink composition comprising an organic pigment but no carbon black is used, the circumference of the nozzle orifice is uniformly wet to form a thin film thereon, making it possible to prevent the jetting direction from being deflected. It is thought also that when the ink composition of the present invention is used, a thin film is uniformly formed on the total circumference around the nozzle orifice, making it possible to prevent the jetting direction from being deflected, as in the case of the ink composition comprising an organic pigment but free of carbon black.

The present invention will be further described in the following examples. However, these examples should not be interpreted as limiting the scope of the present invention. Unless otherwise indicated, herein, all parts, percents, ratios and the like are by weight.

EXAMPLE 1

The ink composition for ink jet recording process according to the invention was prepared in accordance with the following procedure.
(1) Preparation of Various Pigment Dispersions
(a) CB Dispersion 3.5 parts of a styrene-acrylic acid copolymer resin (Joncryl 68: weight-average molecular weight: 10,000; acid value: 195), 2.5 parts of triethanolamine and 0.5 part of isopropyl alcohol were thoroughly dissolved in 78.5 parts of ion-exchanged water under heating at 75° C.

To the solution thus obtained was then added 15 parts of Carbon Black MA-7 (available from Mitsubishi Chemical Corporation). The mixture was premixed and then subjected to dispersion using an Eiger mill (available from Eiger Japan K. K.) until the average particle diameter of the pigment reached 105 nm (bead packing: 70%; media diameter: 0.7 mm) to obtain the desired CB dispersion.
(b) C Dispersion 3.5 parts of a styrene-acrylic acid copolymer resin (Joncryl 68: weight-average molecular weight: 10,000; acid value: 195), 2.5 parts of triethanolamine and 0.5 part of isopropyl alcohol were thoroughly dissolved in 78.5 parts of ion-exchanged water under heating at 75° C.

To the solution thus obtained was then added 15 parts of C.I. Pigment Blue 15:4. The mixture was premixed and then subjected to dispersion using an Eiger mill (available from Eiger Japan K.K.) until the average particle diameter of the pigment reached 100 nm (bead packing: 70%; media diameter: 0.7 mm) to obtain the desired C dispersion.
(c) M dispersion 3 parts of a styrene-acrylic acid copolymer resin (Joncryl 68: weight-average molecular weight: 10,000; acid value: 195), 2 parts of triethanolamine and 0.4 part of isopropyl alcohol were thoroughly dissolved in 79.6 parts of ion-exchanged water under heating at 70° C.

To the solution thus obtained was then added 15 parts of C.I. Pigment Red 202. The mixture was premixed and then subjected to dispersion using an Eiger mill (available from Eiger Japan K.K.) until the average particle diameter of the pigment reached 95 nm (bead packing: 70%; media diameter: 0.7 mm) to obtain the desired M dispersion.
(d) Y dispersion 3 parts of a styrene-acrylic acid copolymer resin (Joncryl 68: weight-average-molecular weight: 10,000; acid value: 195), 2 parts of triethanolamine and 0.4 part of isopropyl alcohol were thoroughly dissolved in 79.6 parts of ion-exchanged water under heating at 70° C.

To the solution thus obtained was then added 15 parts of C.I. Pigment Yellow 74. The mixture was premixed and then subjected to dispersion using an Eiger mill (available from Eiger Japan K.K.) until the average particle diameter of the pigment reached 100 nm (bead packing: 70%; media diameter: 0.7 mm) to obtain the desired Y dispersion.
(2) Preparation of Ink Composition The foregoing various dispersions were then used to prepare an ink composition of the invention.

| | |
|---|---|
| CB Dispersion | 17 parts by weight |
| C Dispersion | 1 part by weight |
| M Dispersion | 1 part by weight |
| Y Dispersion | 1 part by weight |
| Styrene Acryl Ester Emulsion | 5 parts by weight (in solid content equivalence) |
| Diethylene Glycol | 10 parts by weight |

-continued

| | |
|---|---|
| Isomaltose | 4 parts by weight |
| Trehalose | 3 parts by weight |
| Nonionic Surfactant | 0.5 part by weight |
| Disodium Hydrogenphosphate | 0.1 part by weight |
| Ion-Exchange Water | the balance. |

The styrene acryl ester emulsion was an aqueous dispersion having a concentration of 30.0% in solid content equivalence. Therefore, the value given above is as calculated in terms of solid content. As the nonionic surfactant, use was made of an acetylene glycol-type surfactant (Surfynol 465: available from Air Products Co.). The minimum film-forming temperature (MFT) of the styrene acryl ester in the styrene acryl ester emulsion used was 80° C.

The foregoing components were mixed to give an ink composition. The ink composition thus obtained was then passed through a metal mesh filter (twill weave; 2,300 mesh, available from (Manabe Kogyo Co., Ltd.) to obtain an ink composition of the invention.

EXAMPLE 2

The ink composition for ink jet recording process according to the invention was prepared in accordance with the following procedure.
(1) Preparation of Various Pigment Dispersions
(a) CB Dispersion The procedure of Example 1(a) was followed but using Carbon Black #48 (available from Mitsubishi Chemical Corporation) as carbon black to thereby give a CD dispersion.
(b) C Dispersion The procedure of Example 1(b) was followed but using C.I. Pigment Blue 16 as an organic pigment to thereby give a C dispersion.
(c) M dispersion The procedure of Example 1(c) was followed but using C.I. Pigment Violet 19 as an organic pigment to thereby give an M dispersion.
(d) Y dispersion The procedure of Example 1(d) was followed but using C.I. Pigment Yellow 180 as an organic pigment to thereby give a Y dispersion.
(2) Preparation of Ink Composition The foregoing various dispersions were then used to prepare an ink composition of the invention.

| | |
|---|---|
| CB Dispersion | 14 parts by weight |
| C Dispersion | 2 parts by weight |
| M Dispersion | 2 parts by weight |
| Y Dispersion | 2 parts by weight |
| Styrene Acryl Ester Emulsion | 5 parts by weight (in solid content equivalence) |
| Diethylene Glycol | 10 parts by weight |
| Xylose | 3 parts by weight |
| Malose | 4 parts by weight |
| Maltotriose | 3 parts by weight |
| Nonionic Surfactant | 0.5 part by weight |
| Disodium Hydrogenphosphate | 0.1 part by weight |
| Ion-Exchange Water | the balance. |

The styrene acryl ester emulsion was an aqueous dispersion having a concentration of 300% in solid content equivalence. Therefore, the value given above is as calculated in terms of solid content. As the nonionic surfactant, use was made of an acetylene glycol-type surfactant (Surfynol 485:

available from Air Products Co.). The minimum film-forming temperature (MFT) of the styrene acryl ester in the styrene acryl ester emulsion used was 80° C.

The foregoing components were mixed to give an ink composition. The ink composition thus obtained was then passed through a metal mesh filter (twill weave; 2,300 mesh, available from Manabe Kogyo Co., Ltd.) to obtain an ink composition of the invention.

EXAMPLE 3

The ink composition for ink jet recording process according to the invention was prepared in accordance with the following procedure.
(1) Preparation of Various Pigment Dispersions
(a) CB Dispersion
The procedure of Example 1(a) was followed but using Carbon Black MA48 (available from Mitsubishi Chemical Corporation) as carbon black to thereby give a CB dispersion.
(b) C Dispersion
The procedure of Example 1 (b) was followed but using C- I-Pigment Blue 15:3 as an organic pigment to thereby give a C dispersion.
(c) M dispersion
The procedure of Example 1(c) was followed but using C.I. Pigment Red 122 as an organic pigment to thereby give an M dispersion.
(d) Y dispersion
The procedure of Example 1(d) was followed but using C.I. Pigment Yellow 110 as an organic pigment to thereby give a Y dispersion.
(2) Preparation of Ink Composition
The foregoing various dispersions were then used to prepare an ink composition of the invention.

| | |
|---|---|
| CB Dispersion | 24 parts by weight |
| C Dispersion | 1 part by weight |
| M Dispersion | 1 part by weight |
| Y Dispersion | 1 part by weight |
| Styrene Acryl Ester Emulsion | 1 part by weight (in solid content equivalence) |
| Diethylene Glycol | 10 parts by weight |
| Isomaltose | 1 part by weight |
| Trehalose ® (available from Hayashibara Shoji, Inc.) | 2 parts by weight |
| Anionic Surfactant | 0.3 part by weight |
| Nonionic Surfactant | 0.1 part by weight |
| Disodium Hydrogenphosphate | 0.1 part by weight |
| Ion-Exchange Water | the balance. |

The styrene acryl ester emulsion was an aqueous dispersion having a concentration of 30.0% in solid content equivalence. Therefore, the value given above is as calculated in terms of solid content. As the anionic surfactant, use was made of an ammonium salt of polyoxyethylene alkylphenyl ether sulfuric acid (Hitenol No. 7, available from Dai-ichi Kogyo Seiyaku Co., Ltd). As the nonionic surfactant, use was made of an acetylene glycol-type surfactant (Surfynol TG: available from Air Products Co.). The minimum film-forming temperature (MFT) of the styrene acryl ester in the styrene acryl ester emulsion used was 80° C.

The foregoing components were mixed to give an ink composition. The ink composition thus obtained was then passed through a metal mesh filter (twill weave; 2,300 mesh, available from Manabe Kogyo Co., Ltd.) to obtain an ink composition of the invention.

EXAMPLE 4

(1) Dispersion of Mixed Pigment
parts by weight of a styrene-acrylic acid copolymer resin (Joncryl 679: weight-average molecular weight: 7,000; acid value: 200), 4 parts of triethanolamine and 0.5 part of isopropyl alcohol were thoroughly dissolved in 71.5 parts of ion-exchanged water under heating at 70° C.

To the solution thus obtained were then added 16 parts of Carbon Black MA-100 (available from Mitsubishi Chemical Corporation), 1 part by weight of C.I. Pigment Blue 15:3 (phthalocyanine blue G), 1 part by weight of C.I. Pigment Red 122 and 1 part by weight of C.I. Pigment Yellow 138. The mixture was premixed and then subjected to dispersion using an Eiger mill (available from Eiger Japan K.K.) until the average particle diameter of the pigment reached 95 to 110 nm (bead packing: 70%; media diameter: 0.7 mm) to obtain the desired mixed pigment dispersion.
(2) Preparation of Ink Composition
The procedure of Example 1. was followed but using the formulation set forth in Table 1 below in the amounts set forth in Table 1. Thus, the ink composition of Example 4 was obtained.

Comparative Example 1

The procedure of Example 1 was followed but using the formulation set forth in Table 1 below in the amounts set forth in Table 1. Thus, the ink composition of Comparative Example 1 was obtained. The ink composition of Comparative Example 1 was the same as the ink composition of Example 1 but the pigment comprised carbon black alone.

Comparative Example 2

The procedure of Example 1 was followed but using the formulation set forth in Table 1 below in the amounts set forth in Table 1. Thus, the ink composition of Comparative Example 2 was obtained. The ink composition of Comparative Example 2 was the sane as the ink composition of Example 1 but the saccharides were replaced by diethylene glycol.

Table 1 shows the formulation of the ink compositions of Examples 1 to 4 and Comparative Examples 1 and 2 wherein each value indicates the content expressed in % by weight.

TABLE 1

| Pigment | | Example | | | | C. Example | |
|---|---|---|---|---|---|---|---|
| Dispersion | Pigment | 1 | 2 | 3 | 4 | 1 | 2 |
| Carbon black dispersion | Carbon black MA-7 | 17.0 | | | | 20.0 | 17.0 |
| | Carbon black MA-#48 | | 14.0 | | | | |
| | Carbon black MA-8 | | | 24.0 | | | |
| Cyan pigment dispersion | C.I. Pigment Blue 15:4 | 1.0 | | | | | 1.0 |
| | C.I. Pigment Blue 16 | | 2.0 | | | | |
| | C.I. Pigment Blue 15:3 | | | 1.0 | | | |
| Organic magenta pigment dispersion | C.I. Pigment Red 202 | 1.0 | | | | | 1.0 |
| | C.I. Pigment Violet 19 | | 2.0 | | | | |
| | C.I. Pigment Red 122 | | | 1.0 | | | |
| Organic yellow pigment | C.I. Pigment Yellow 74 | 1.0 | | | | | 1.0 |
| | C.I. Pigment | | 2.0 | | | | |

TABLE 1-continued

| Pigment | | Example | | | | C. Example | |
|---|---|---|---|---|---|---|---|
| Dispersion | Pigment | 1 | 2 | 3 | 4 | 1 | 2 |
| dispersion | Yellow 180 | | | | | | |
| | C.I. Pigment Yellow 110 | | | 1.0 | | | |
| Mixed pigment dispersion | | | | | 35.0 | | |
| Thermoplastic resin emulsion | Styrene acrylic acid ester | 5.0 | 5.0 | 1.0 | 4.0 | 5.0 | 5.0 |
| Water-soluble organic solvent | Diethylene glycol | 10.0 | 10.0 | 10.0 | 10.0 | 10.0 | 10.0 |
| | Xylose | | | 3.0 | | | |
| | Isomaltose | 4.0 | | 1.0 | 4.0 | 4.0 | |
| | Trehalose | 3.0 | | | 3.0 | 3.0 | |
| | Maltose | | 4.0 | | | | |
| | Maltotriose | | 3.0 | | | | |
| | Trehaose | | | 2.0 | | | |
| Surfactant | Surfynol 465 | 0.50 | | | | 0.50 | 0.50 0.50 |
| | Surfynol 485 | | 0.50 | | | | |
| | Surfynol TG | | | 0.3 | | | |
| | Hitenol No. 7 | | | | 0.1 | | |
| pH buffer | Disodium hydrogen-phosphate | 0.10 | 0.10 | 0.10 | 0.10 | 0.10 | 0.10 |
| Water | Ion-exchanged water | q.s. | q.s. | q.s. | q.s. | q.s. | q.s. |

Evaluation of Properties

Next, the ink jet recording process using the ink compositions prepared in Examples 1 to 4 and Comparative Examples 1 and 2 and various properties of the resulting printed material were evaluated.

(1) Evaluation of Jetting Stability

Each ink composition was packed into a recording head provided with a piezoelectric element. The ink composition was then jetted from the nozzle. Thus, it was evaluated in "a. Malalignment" and "b. Nozzle fill-in (clogging)".

a. Evaluation of Malalignment

The ink composition was packed into a recording head provided with a piezoelectric element and jetted from the nozzle to print on a recording medium (Xerox-4024). The conditions at the beginning of printing and after 2 hours were compared and the results were evaluated in accordance with the following 3 grades.

A: Even after two hours of continuous printing, the ink composition flew as in the initial stage without being deflected (malalignment).

B: After two hours of continuous printing, the ink composition flew in somewhat deflected directions (malalignment). The print quality was acceptable, though inferior to that at the initial stage. No white striping occurred in the solid area.

C: After two hours of continuous printing, the ink composition flew in drastically deflected directions (malalignment). White striping occurred in the solid area.

b. Evaluation of Nozzle Fill-in (clogging)

The ink composition was packed into a recording head provided with a piezoelectric element and jetted from the nozzles to print on a recording medium (Xerox-4024). After allowing all nozzles to stand as such printing was carried out again. Then the jetting conditions from the nozzles were evaluated in accordance with the following 3 grades.

A: After allowing to stand for 1 month, the ink composition could be jetted from all nozzles without showing clogging.

B: After allowing to stand for 1 month, several nozzles were clogged (fill-in). The printed letters were distinguishable and the print quality was acceptable, though inferior to that at the initial stage.

C: After allowing to stand for 1 month, more than several nozzles were clogged (fill-in). The printed letters were hardly distinguishable and the print quality was inferior to that at the initial stage.

(2) Light Fastness

The printed matter prepared from the ink composition was exposed to a xenon fadeometer for 200 hours. The change in chromaticity before and after the exposure was then determined. For the measurement of chromaticity, the distance (color difference; $\Delta E$) on the chromaticity coordinates by CIEL*a*b* color specification method was measured before and after the exposure. The results were then evaluated in accordance with the following 3 grades.

A: $\Delta E \leq 3$; Little or no fading observed.
B: $3 < \Delta E \leq 6$; Some but acceptable fading observed.
C: $\Delta E > 6$; Significant fading observed.

(3) Water Fastness

The printed matter prepared form the ink composition was rubbed with a commercially available fluorescent aqueous ink containing pen (ZEBRA FLUORESCENT PEN 2) on the printed image under a load of 300 g. The results were evaluated in accordance with the following 3 grades.

A: No bleeding, no tailing occurred.
B: No bleeding but some tailing occurred.
C: Bleeding and tailing occurred.

Table 2 shows the evaluation data of the ink compositions prepared in Examples 1 to 4 and Comparative Examples 1 and 2 in accordance with the foregoing methods.

In the recording process, use was made of a recording apparatus having a platen equipped with a heating means and droplets of the ink composition were jetted onto a heated recording medium.

TABLE 2

| | Jetting stability | | Light Fastness | | Water |
|---|---|---|---|---|---|
| | Alignment | Fill-in | Chromaticity | | fastness |
| Example 1 | A | A | 1.9 | A | A |
| Example 2 | A | A | 1.6 | A | A |
| Example 3 | A | A | 1.3 | A | A |
| Example 4 | A | A | 1.2 | A | A |
| C. Example 1 | C | B | 0.9 | A | A |
| C. Example 2 | B | C | 2.0 | A | A |

The ink composition according to the invention contains a combination of carbon black with an organic pigment and thus can provide an excellent print quality with a good light fastness without causing malalignment from the ink bead or nozzle fill-in even after a prolonged ink jet printing.

While the invention has been described in detail and with reference to specific embodiments thereof, it will be apparent to one skilled in the art that various changes and modifications can be made therein without departing from the spirit and scope thereof.

What is claimed is:

1. An ink composition for ink jet recording, comprising
   (1) a carbon black,
   (2) an organic pigment,
   (3) a dispersant and
   (4) at least one saccharide incorporated in an aqueous medium.

2. The ink composition according to claim 1, comprising at least one organic pigment selected from the group consisting of C.I. pigment yellow, C.I. pigment red and C.I. pigment blue.

3. The ink composition according to claim 2, comprising C.I. pigment yellow, C.I. pigment red and C.I. pigment blue.

4. The ink composition according to any one of claims 1 to 3, further comprising a thermoplastic resin emulsion.

5. The ink composition according to any one of claims 1 to 3, wherein the saccharide is selected from the group consisting of monosaccharides, disaccharides and polysaccharides.

6. The ink composition according to claim 5, wherein the saccharide is a monosaccharide selected from the group consisting of glucose, mannose, fructose, ribose, xylose, arabinose, galactose, furanose, talose, erythrol, threose, erythrose, xylulose, tagatose and sorbose.

7. The ink composition according to claim 5, wherein the saccharide is a disaccharide selected from the group consisting of saccharose, maltitol, maltose, mannitol, glucitol, lactose, cellobiose, trehalose, nigerose, isomaltose and isotrehalose.

8. The ink composition according to claim 5, wherein the saccharide is a polysaccharides selected from the group consisting of maltotriose, panose, isomaltotriose, maltotetraose and maltopentaose.

9. The ink composition according to any one of claims 1 to 3, wherein the saccharide is present in an amount less than 15% by weight based on a total weight of the ink composition.

10. The ink composition according to any one of claims 1 to 3, wherein the saccharide is present in an amount from 3 to 10% by weight based on a total weight of the ink composition.

11. The ink composition according to any one of claims 1 to 3, further comprising a water-soluble polyvalent alcohol.

12. A process for the preparation of an ink composition for ink jet recording, which comprises simultaneously adding
 (1) a carbon black,
 (2) an organic pigment,
 (3) a dispersant and
 (4) at least one saccharide
 to an aqueous medium, and then subjecting the mixture to dispersion.

13. An ink jet recording process, which comprises jetting an ink composition according to any one of claims 1 to 3 as an ink droplet onto a recording medium.

14. An ink jet recording process, which comprises jetting an ink composition according to claim 4 as an ink droplet onto a recording medium.

15. An ink jet recording process, which comprises jetting an ink composition according to claim 5 as an ink droplet onto a recording medium.

16. The recording process according to claim 13, which comprises jetting an ink composition onto a heated recording an ink droplet.

17. The recording process according to claim 14, which comprises jetting an ink composition onto a heated recording an ink droplet.

18. The recording process according to claim 15, which comprises jetting an ink composition onto a heated recording an ink droplet.

* * * * *